(12) United States Patent
Iwano

(10) Patent No.: US 9,272,735 B2
(45) Date of Patent: Mar. 1, 2016

(54) OPENING-CLOSING BODY STRUCTURE FOR VEHICLE

(71) Applicant: TOYOTA JIDOSHA KABUSHIKI KAISHA, Toyota-shi, Aichi-ken (JP)

(72) Inventor: Yoshihiro Iwano, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/435,650

(22) PCT Filed: Sep. 12, 2013

(86) PCT No.: PCT/JP2013/074761
§ 371 (c)(1),
(2) Date: Apr. 14, 2015

(87) PCT Pub. No.: WO2014/061383
PCT Pub. Date: Apr. 24, 2014

(65) Prior Publication Data
US 2015/0266514 A1    Sep. 24, 2015

(30) Foreign Application Priority Data
Oct. 19, 2012    (JP) .................. 2012-232035

(51) Int. Cl.
*B62D 25/12*    (2006.01)
*B62D 25/10*    (2006.01)
*E05F 5/02*    (2006.01)

(52) U.S. Cl.
CPC ................ *B62D 25/12* (2013.01); *B62D 25/10* (2013.01); *B62D 25/105* (2013.01); *E05F 5/022* (2013.01); *E05Y 2900/536* (2013.01)

(58) Field of Classification Search
CPC ...... B62D 25/10; B62D 25/12; B62D 25/105; E05F 5/022; E05F 5/025
USPC .............. 296/193.11; 180/69.2, 69.21–69.23; 16/82–85, 86 R, 86 A
See application file for complete search history.

(56) References Cited

U.S. PATENT DOCUMENTS 5,682,667 A * 11/1997 Flagg .................. B62D 25/105
                                                          180/69.2
6,039,388 A *  3/2000 Choi ....................... E05F 5/022
                                                           16/86 R

FOREIGN PATENT DOCUMENTS

| DE | 19644236 C2 * | 5/2002 | ............ B62D 25/12 |
|---|---|---|---|
| EP | 2433851 A1 | 3/2012 | |
| JP | H04-372475 A | 12/1992 | |
| JP | H07-002367 Y2 | 1/1995 | |
| JP | 2005-335577 A | 12/2005 | |
| JP | 2010-167884 A | 8/2010 | |
| JP | 2012-071623 A | 4/2012 | |

* cited by examiner

*Primary Examiner* — Dennis H Pedder
(74) *Attorney, Agent, or Firm* — Oliff PLC

(57) ABSTRACT

An opening-closing body structure for a vehicle can improve build state of a vehicle opening-closing body. Reinforcement beads extending in three directions from stopper contact portions are formed at an inner hood panel. The three reinforcement beads are each formed at a position that is not on the same straight line as any other reinforcement bead. The reinforcement bead extends from the stopper contact portion toward the hood front side and is connected to an outer peripheral bead. The reinforcement beads are coupled to a framework portion by coupling beads.

8 Claims, 4 Drawing Sheets

OPENING-CLOSING BODY STRUCTURE FOR VEHICLE

TECHNICAL FIELD

The present invention relates to an opening-closing body structure for a vehicle.

BACKGROUND ART

A vehicle hood, for example, is known as a vehicle opening-closing body. In some vehicle hoods, a portion of a hood inner panel forms a stopper contact portion that contacts a stopper rubber provided at a vehicle body opening side (see, for example, Japanese Patent Application Laid-Open No. 2010-167884). In such hoods, the stopper contact portion bears load toward the vehicle upper side from the stopper rubber when the hood is closed and a front end portion of the hood is pulled in toward the vehicle lower side and locked.

PRIOR ART PUBLICATIONS

Japanese Patent Application Laid-Open (JP-A) No. 2010-167884

SUMMARY OF INVENTION

Technical Problem

However, if the stopper contact portion caves in when the hood is closed due to a reduction in rigidity of the hood inner panel that may be accompanied with weight reduction of the hood inner panel or the like, for example, then the build state of the hood is affected.

In consideration of the above circumstances, an object of the present invention is to obtain a vehicle opening-closing body structure that can improve the build performance of a vehicle opening-closing body.

Solution to Problem

An opening-closing body structure for a vehicle according to a first aspect of the present invention includes a stopper contact portion that is formed at a hood inner panel configuring an inner panel of a hood, serving as an opening-closing body covering an opening of a vehicle body front section and capable of opening and closing, and that contacts a stopper provided at the opening when the hood is in a closed state, at least three reinforcement beads that are formed at the hood inner panel, that extend in at least three directions from the stopper contact portion, and that are each formed at a position that is not on the same straight line as any other reinforcement bead, and an outer peripheral bead formed running along an outer peripheral portion of the hood inner panel. A first reinforcement bead that is one of the at least three reinforcement beads extends from the stopper contact portion toward the hood front side and is connected to the outer peripheral bead. A second reinforcement bead that is another of the at least three reinforcement beads extends from the stopper contact portion toward inside in a hood width direction. A third reinforcement bead that is yet another of the at least three reinforcement beads extends from the stopper contact portion toward outside in the hood width direction with being angled toward the rear side.

In the opening-closing body structure for the vehicle according to the first aspect of the present invention, at least three reinforcement beads are formed at the hood inner panel formed with the stopper contact portion. Thus in the event of load acting on the stopper contact portion when the hood serving as an opening-closing body is closed, the load is distributed by the at least three reinforcement beads, thereby preventing or effectively suppressing the stopper contact portion from caving in. The reinforcement beads extend in at least three directions from the stopper contact portion, and are each formed in a position that is not on the same straight line as any other reinforcement bead. The first reinforcement bead extends from the stopper contact portion toward the hood front side, the second reinforcement bead extends from the stopper contact portion toward the hood width direction inside, and the third reinforcement bead extends from the stopper contact portion toward the hood width direction outside while being angled toward the rear side. As a result, bending deformation about the reinforcement beads is not enhanced, even though the at least three reinforcement beads are formed.

Moreover, since the outer peripheral bead is formed running along the outer peripheral portion of the hood inner panel, overall torsional rigidity of the hood is improved, and there is good operability when the hood is opened and closed. Moreover, the first reinforcement bead extending from the stopper contact portion toward the hood front side is connected to the outer peripheral bead. A portion of the load acting on the stopper contact portion when the opening-closing body is closed is accordingly borne by the outer peripheral bead through the at least one reinforcement bead. Local deformation at the stopper contact portion of the hood inner panel is thereby effectively suppressed.

A second aspect of the present invention is the opening-closing body structure for the vehicle according to the first aspect, wherein the third reinforcement bead is connected to the outer peripheral bead.

In the opening-closing body structure for the vehicle according to the second aspect of the present invention, the third reinforcement bead is connected to the outer peripheral bead. A portion of the load acting on the stopper contact portion when the hood is closed is accordingly borne by the outer peripheral bead through the third reinforcement bead. Local deformation at the stopper contact portion of the hood inner panel is thereby effectively suppressed.

A third aspect of the present invention is the opening-closing body structure for the vehicle according to the first aspect or the second aspect, wherein at least one of the second reinforcement bead or the third reinforcement bead has a terminal portion in the extension direction from the stopper contact portion that is smoothly contiguous, without a step, to a planar portion of the panel beyond the terminal portion in the extension direction.

In the opening-closing body structure for the vehicle according to the third aspect of the present invention, the at least one of the second reinforcement bead or the third reinforcement bead has a terminal portion in the extension direction from the stopper contact portion that is smoothly contiguous, without a step, to the planar portion of the hood inner panel that is located beyond the terminal portion in the extension direction. A portion of the load acting on the stopper contact portion when the hood is closed is thereby borne by the planar portion of the hood inner panel through the at least one reinforcement bead. Namely, a portion of the load acting on the stopper contact portion can be borne by the planar portion of the hood inner panel that is distanced from the stopper contact portion A fourth aspect of the present invention is the opening-closing body structure for the vehicle according to any one of the first aspect to the third aspect, further including a framework portion formed at a central region of the hood inner panel, and a coupling bead that couples the framework portion and at least one of the at least three reinforcement beads.

In the opening-closing body structure for the vehicle according to the fourth aspect of the present invention, the framework portion is formed at the central region of the hood inner panel, and the coupling bead couples the framework portion and the at least one of the at least three reinforcement beads. A portion of the load acting on the stopper contact portion is thereby borne by the framework portion through the at least one reinforcement bead and the coupling bead. Local deformation at the stopper contact portion of the inner hood panel is thereby effectively suppressed.

Advantageous Effects of Invention

As explained above, the opening-closing body structure for the vehicle according to the first aspect of the present invention has an excellent advantageous effect of improving the build state of the hood serving as the vehicle opening-closing body.

The opening-closing body structure for the vehicle according to the second aspect of the present invention has an excellent advantageous effect of enabling local deformation of the hood inner panel be suppressed, by distributing a portion of load acting on the stopper contact portion through the third reinforcement bead to the outer peripheral bead when the hood is closed.

The opening-closing body structure for the vehicle according to the third aspect of the present invention has an excellent advantageous effect of widely distributing load at a location that is distanced from the stopper contact portion, by distributing a portion of load acting on the stopper contact portion to the planar face of the hood inner panel when the hood is closed.

The vehicle opening-closing body structure according to the fourth aspect of the present invention has an excellent advantageous effect of enabling local deformation of the hood inner panel be suppressed, by distributing a portion of load acting on the stopper contact portion to the framework portion through the coupling bead when the hood is closed.

DESCRIPTION OF EMBODIMENTS

Exemplary Embodiment Configuration

Explanation follows regarding a vehicle opening-closing body structure according to an exemplary embodiment of the present invention, with reference to FIG. 1 to FIG. 4B. Note that in each of the drawings, the arrow FR indicates the vehicle front side, the arrow UP indicates the vehicle upper side, and the arrow W indicates the vehicle width direction, as appropriate. Moreover, when a hood is in a closed state, the hood front side is in the same direction as the vehicle front side, and the hood upper side is in the same direction as the vehicle upper side.

Figure 1:
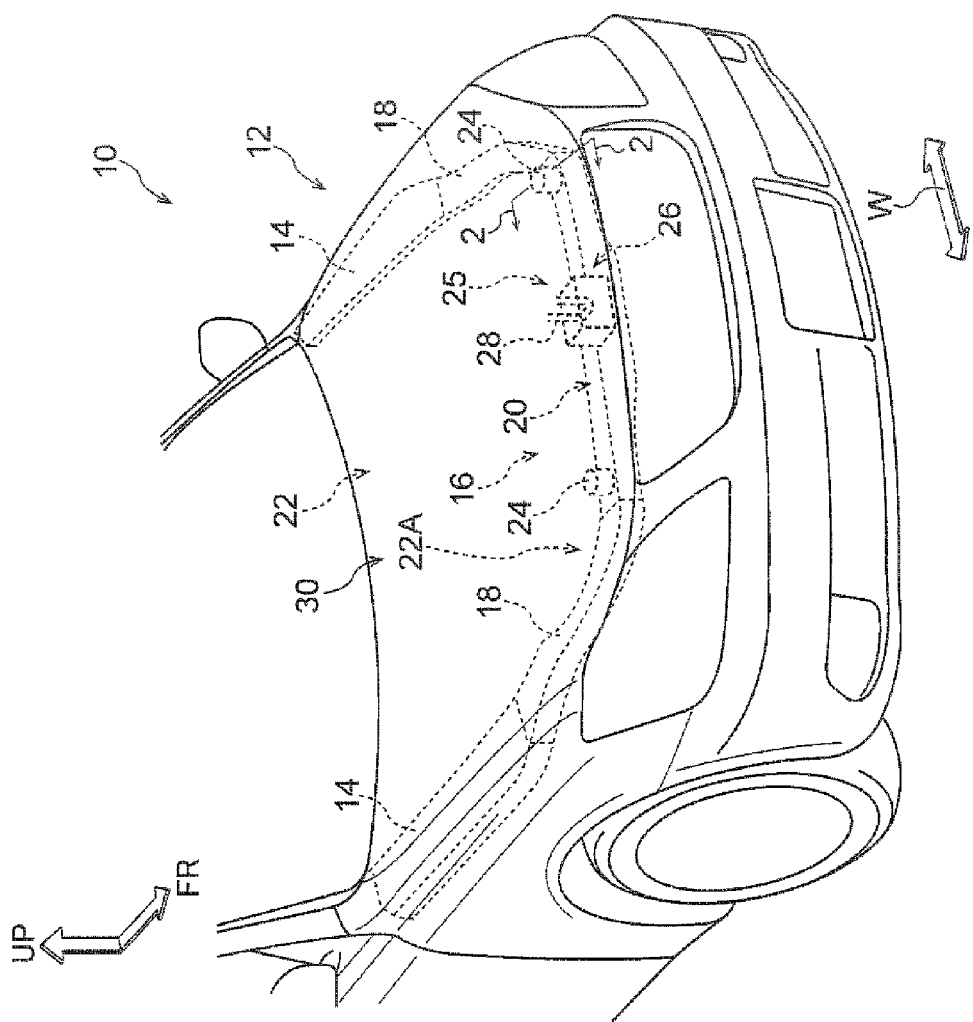
FIG. 1 is a perspective view illustrating a vehicle front side provided with a hood applied with an opening-closing body structure for a vehicle according to an exemplary embodiment of the present invention.

FIG. 1 is a perspective view illustrating a vehicle front section 12 of an automobile (vehicle) 10. As illustrated in FIG. 1, upper apron members 14 are installed running along the vehicle front-rear direction at an upper portion of both end sides in the vehicle width direction of the vehicle front section 12. Front end portions of the upper apron members 14 are joined to respective rear end portions of side upper radiator supports 18. The side upper radiator supports 18 extend from the rear end portions toward the vehicle front side angled toward the vehicle width direction inside.

Front end portions of the side upper radiator supports 18 are respectively joined to both vehicle width direction ends of an upper radiator support 20. The upper radiator support 20 is disposed at an upper portion of the vehicle front end side with its length direction in the vehicle width direction, and supports an upper portion of a radiator (not illustrated in the drawings). As illustrated in the enlarged cross-section in FIG. 2 taken along line 2-2 in FIG. 1, the upper radiator support 20 is formed with a substantially hat shaped cross-section open to the vehicle lower side.

A radiator support 16, including the side upper radiator supports 18 and the upper radiator support 20 illustrated in FIG. 1, is configured in a substantially rectangular frame shape in face-on view, not illustrated in the drawings.

Figure 2:
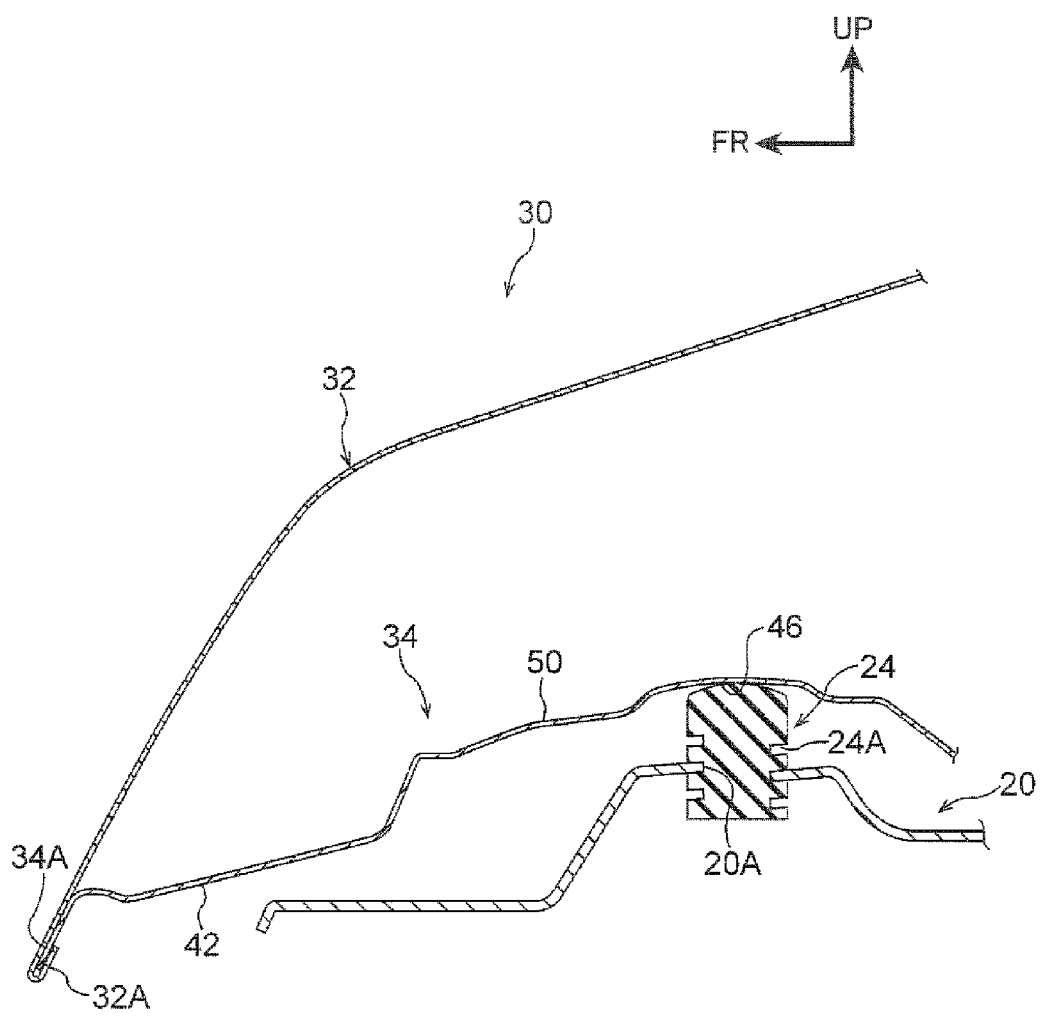
FIG. 2 is an enlarged cross-section taken along line 2-2 in FIG. 1.

As illustrated in FIG. 1 and FIG. 2, stopper rubbers 24 (also described as hood stoppers or cushion stoppers, elements falling within the broad definition of shock-absorbing bodies), serving as shock-absorbing stoppers, are respectively attached to upper portions at both vehicle width direction end sides of the upper radiator support 20. Namely, the stoppers are provided at a vehicle body front section opening (vehicle body opening) 22A (see FIG. 1).

To explain specifically, as illustrated in FIG. 2, attachment holes 20A to attach the stopper rubbers 24 are formed piercing through the upper radiator support 20. A notch (not illustrated in the drawings) is formed to a portion of hole edge portions of each of the attachment holes 20A, notched at the radial direction outside of the attachment hole 20A. The hole edge portions of the attachment hole 20A gradually slope downward from one hole edge portion to the other hole edge portion, facing each other with the notch interposed therebetween. A turn of a female thread is thereby formed in the hole edge portions of the attachment hole 20A.

Each of the stopper rubbers 24 is formed in a substantially circular column shape, and a spiral shaped groove 24A is formed at an outer peripheral portion of the stopper rubber 24. The stopper rubber 24 is screwed in from the notch side into the attachment hole 20A by screwing the spiral shaped groove 24A into the hole edge portions of the attachment hole 20A. The stopper rubbers 24 supported by the upper radiator support 20 are capable of resilient deformation in substantially the vehicle up-down direction.

As illustrated in FIG. 1, the upper apron members 14, the side upper radiator supports 18, and the upper radiator support 20 are disposed inside an engine room 22. The engine room 22 is covered by a hood 30 (an engine hood), serving as an opening-closing body capable of opening and closing. Namely the hood 30 is attached to the upper apron members 14 by hinges (not illustrated in the drawings) at a rear end portion, and the hood 30 can rotatably move about the hinge axis of the hinges in the vehicle width direction to open and close the engine room 22 (the vehicle front section opening 22A). The upper apron members 14, the side upper radiator supports 18, and the upper radiator support 20 are positioned at the vehicle lower side of the hood 30 when the hood 30 is in the closed state.

As illustrated in FIG. 2, the hood 30 includes an outer hood panel 32 configuring an outer panel of the hood 30 (an outside portion forming an upper portion in the closed state). The hood 30 also includes an inner hood panel 34, disposed at the hood lower side of the outer hood panel 32 and serving as a panel configuring an inner panel of the hood 30 (an inside portion forming a lower portion in the closed state). An outer peripheral edge 32A of the outer hood panel 32 and an outer peripheral edge 34A of the inner hood panel 34 are joined together by hemming processing. Both panels form a closed cross-section structure when the outer hood panel 32 and the inner hood panel 34 are in an assembled state, with a gap formed in the hood up-down direction between both panels.

As illustrated in FIG. 1, a hood locking section 25 is installed at a position corresponding to a hood width direction center portion of a front end portion 30A of the hood 30 in the closed state. The hood locking section 25 is configured including a hood locking device 26 (illustrated as a block in the drawings) installed at the upper radiator support 20 inside the engine room 22, and a striker 28 installed to the hood 30. The striker 28 forms a curved shape (a substantially U-shape) open to the hood upper side in a vehicle side view. A latch (not illustrated in the drawings) configuring a portion of the hood locking device 26 is capable of latching the striker 28. The front end portion of the hood 30 is pulled in toward the hood lower side in a state in which the latch engages with the striker 28.

Figure 3:
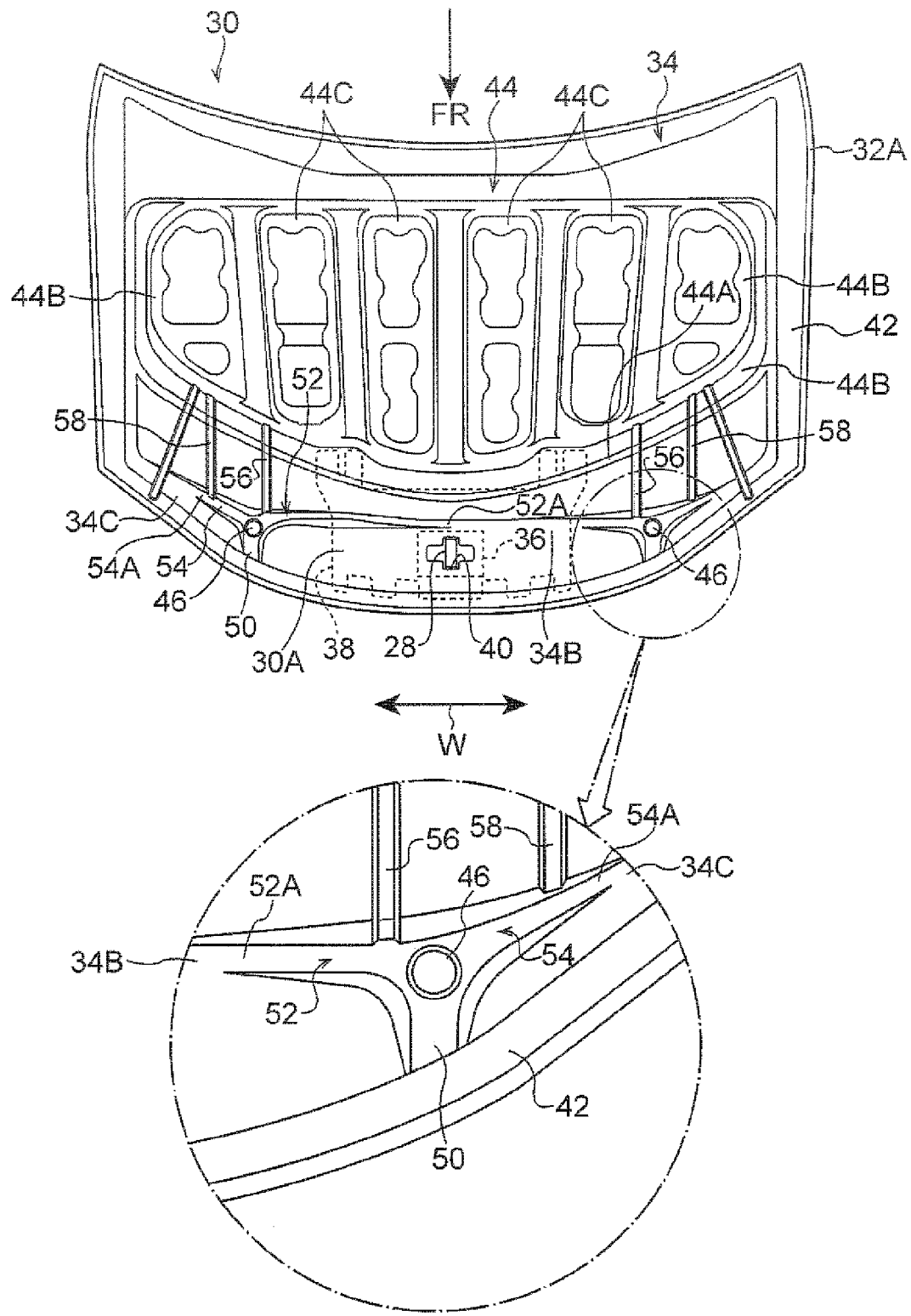
FIG. 3 is a bottom face view illustrating the hood of FIG. 1 in a state viewed from a lower face side.

FIG. 3 illustrates a bottom face view of the hood 30 (a state viewed from the hood lower side). As illustrated in FIG. 3, an insertion hole 40, for inserting the striker 28 through from the hood upper side, is formed piercing through a center portion of a front end of the inner hood panel 34. A pair of front and rear attachment base ends of the striker 28 curve to one side and the other side in the vehicle width direction (not illustrated in the drawings), and are fixed to a base plate 36 at the hood upper side of the inner hood panel 34. The base plate 36 is fixed to hood lock reinforcement 38 (an element falling within the broad definition of a hood front end reinforcement member).

The hood lock reinforcement 38 is plate shaped, extends along the hood width direction disposed between the outer hood panel 32 (see FIG. 2) and the inner hood panel 34, and serves as reinforcement at the front end portion 30A of the hood 30. An insertion hole (not illustrated in the drawings) corresponding to the insertion hole 40 of the inner hood panel 34 is formed piercing through the hood lock reinforcement 38. The hood lock reinforcement 38 is welded to the inner hood panel 34 at a peripheral portion of the insertion hole 40, and reinforces the periphery of the striker attachment portion on the hood 30.

An outer peripheral bead 42 is formed running along an outer peripheral portion of the inner hood panel 34 configuring an inner face of the hood 30. The outer peripheral bead 42 is formed so as to protrude to the hood lower side, and runs around the outer peripheral portion of the inner hood panel 34. A framework portion 44 is formed at a central region of the inner hood panel 34.

The framework portion 44 is provided at the inner hood panel 34 at the inside of the outer peripheral bead 42, further to the hood rear side than the attachment portion of the striker 28. In the present exemplary embodiment, the framework portion 44 is set at a position substantially further to the hood upper side than the outer peripheral portion. A front wall 44A is formed at an end portion at the hood front side of the framework portion 44. Flat portions 44B, that are substantially U-shaped in a hood bottom face view, are formed at the framework portion 44 at the hood rear side of the front wall 44A. General faces of the flat portions 44B are disposed with their in-plane direction including the hood width direction. Plural raised portions 44C are formed at the framework portion 44, inside the flat portions 44B that are substantially U-shaped in the hood bottom face view. The raised portions 44C are provided in order to increase the rigidity of the central region of the inner hood panel 34, are formed in shapes protruding toward the hood upper side, and are aligned in a row at specific intervals along the hood width direction. An opening is formed at an apex portion of each of the raised portions 44C in order to reduce weight. A portion of the apex portion of each of the raised portions 44C is joined to a back face of the outer hood panel 32 (see FIG. 2) using adhesive (mastic).

Stopper contact portions 46 are formed to the inner hood panel 34 at both left and right sides in the hood width direction thereof, further to the hood front side than the framework portion 44. The stopper contact portions 46 are set in positions that contact the respective stopper rubbers 24 (see FIG. 1) when the hood 30 is in the closed state. As illustrated in FIG. 2, when the hood 30 is closed, the stopper rubbers 24 are accordingly present between the respective stopper contact portions 46 of the hood 30 and the upper radiator support 20. As illustrated in FIG. 2 and FIG. 3, in the present exemplary embodiment, each of the stopper contact portions 46 is a location where a portion of a lower face of the inner hood panel 34 is slightly indented toward the hood upper side, and is formed in a circular shape in the bottom face view.

As illustrated in the partially enlarged view in FIG. 3 etc., reinforcement beads 50, 52, 54 are formed at the inner hood panel 34, extending in plural directions (three directions in the present exemplary embodiment) from each of the stopper contact portions 46. The plural (three in the present exemplary embodiment) reinforcement beads 50, 52, 54 are each set in a position that is not on the same straight line along which any other reinforcement bead extends. In other words, the extension direction of the three reinforcement beads 50, 52, 54 is not set in the opposite direction to the extension direction of any other reinforcement bead. The reinforcement beads 50, 52, 54 are each formed in a shape protruding toward the hood upper side. Each apex portion of the mutually adjacent reinforcement beads 50, 52, 54 is smoothly coupled each other without a step at the outer peripheral side of the stopper contact portion 46. Side portions of each of the mutually adjacent reinforcement beads 50, 52, 54 are also smoothly coupled so as to be contiguous to each other at the outer peripheral side of the stopper contact portion 46. In the present exemplary embodiment, the reinforcement beads 50, 52, 54 at the vehicle left side and the reinforcement beads 50, 52, 54 at the vehicle right side are set with substantial left-right symmetry, and so the same reference numerals are applied to reinforcement beads that have a symmetrical relationship to each other.

The first reinforcement bead 50 that is one of the plural reinforcement beads 50, 52, 54 extends from the stopper contact portion 46 toward the hood front side, and is connected to the outer peripheral bead 42. The second reinforcement bead 52 and the third reinforcement bead 54 that are the respective remaining two beads are not connected to the outer peripheral bead 42.

The second reinforcement bead 52 extends from the stopper contact portion 46 toward the hood width direction inside. A terminal portion 52A at the hood width direction inside of the second reinforcement bead 52 (a terminal portion in the extension direction from the stopper contact portion 46) is smoothly contiguous, without a step, to a planar portion 34B of the inner hood panel 34 beyond the terminal portion 52A in a direction toward the hood width direction inside (the extension direction). In the present exemplary embodiment, the extension length of the second reinforcement bead 52 is set longer than the extension length of the first reinforcement bead 50.

In the present exemplary embodiment, the terminal portion 52A at the hood width direction inside of the second reinforcement bead 52 on the vehicle left side is set at a position superimposed on the hood lock reinforcement 38 in the hood up-down direction. Note that although the terminal portion 52A at the hood width direction inside of the second reinforcement bead 52 on the vehicle right side is not set at a position superimposed on the hood lock reinforcement 38 in the hood up-down direction, it may be set at a superimposed position.

The second reinforcement bead 52 is coupled to the framework portion 44 by a first coupling bead 56. The first coupling bead 56 is formed in a protruding shape toward the hood upper side, and extends in a direction intersecting the extension direction of the second reinforcement bead 52, namely, in the hood front-rear direction. A front end portion of the first coupling bead 56 is connected to a side portion (rear end portion) at the hood width direction outside of the second reinforcement bead 52. A rear end portion of the first coupling bead 56 is connected to the front wall 44A and the flat portion 44B of the framework portion 44.

The third reinforcement bead 54 extends from the stopper contact portion 46 toward the hood width direction outside, angled toward the rear side. A terminal portion 54A at the angled rear side and hood width direction outside of the third reinforcement bead 54 (a terminal portion in the extension direction from the stopper contact portion 46) is smoothly contiguous, without a step, to a planar portion 34C of the inner hood panel 34 beyond the terminal portion 54A in a direction angled toward the rear side and hood width direction outside (the extension direction). In the present exemplary embodiment, the extension length of the third reinforcement bead 54 is set longer than the extension length of the first reinforcement bead 50.

The third reinforcement bead 54 is coupled to the framework portion 44 by a second coupling bead 58. The second coupling bead 58 is formed in a protruding shape toward the hood upper side, and extends in a direction intersecting the extension direction of the third reinforcement bead 54, namely in the hood front-rear direction. A front end portion of the second coupling bead 58 is connected to a side portion (rear end portion) at the hood width direction outside of the third reinforcement bead 54. A rear end portion of the second coupling bead 58 is connected to the front wall 44A and the flat portion 44B of the framework portion 44.

Operation and Advantageous Effects of the Exemplary Embodiment

Explanation follows regarding operation and advantageous effects of the above exemplary embodiment.

The plural reinforcement beads 50, 52, 54 are formed to the inner hood panel 34 to which the stopper contact portions 46 are formed. Thus in the event of load acting on the stopper contact portions 46 from the stopper rubbers 24 when the hood 30 is closed (see FIG. 2), the load is distributed by the plural reinforcement beads 50, 52, 54, thereby preventing or effectively suppressing the stopper contact portions 46 from caving in. The reinforcement beads 50, 52, 54 extend in plural directions from the stopper contact portion 46, and are each set in a position that is not on the same straight line as any other reinforcement bead. As a result, bending deformation about the plural reinforcement beads 50, 52, 54 is not generated, even though the plural reinforcement beads 50, 52, 54 are formed.

In the present exemplary embodiment, since the outer peripheral bead 42 is formed running along the outer peripheral portion of the inner hood panel 34, overall torsional rigidity of the hood 30 is improved, and there is good operability when the hood 30 is opened and closed. Moreover, the first reinforcement bead 50 that is one of the plural reinforcement beads 50, 52, 54 is connected to the outer peripheral bead 42. A portion of the load acting on each of the stopper contact portions 46 when the hood 30 is closed is accordingly borne by the outer peripheral bead 42 through the first reinforcement bead 50. Local deformation at the stopper contact portions 46 of the inner hood panel 34 is thereby effectively suppressed.

In the present exemplary embodiment, the plural reinforcement beads 50, 52, 54 include the second reinforcement bead 52 and the third reinforcement bead 54 that are not connected to the outer peripheral bead 42. A portion of the load acting on the stopper contact portions 46 when the hood 30 is closed is thereby borne by locations other than the outer peripheral bead 42 through the second reinforcement bead 52 and the third reinforcement bead 54.

In the present exemplary embodiment, the terminal portions 52A, 54A of the second reinforcement bead 52 and the third reinforcement bead 54 extending from the stopper contact portions 46 are smoothly contiguous, without a step, to respective planar portions 34B, 34C of the inner hood panel 34 beyond the respective terminal portions 52A and 54A in the extension directions. A portion of the load acting on the stopper contact portions 46 when the hood 30 is closed is thereby borne by the planar portions 34B, 34C of the inner hood panel 34 through the second reinforcement bead 52 and the third reinforcement bead 54. Namely, a portion of the load acting on the stopper contact portions 46 can be borne by the planar portions 34B, 34C of the inner hood panel 34 that are distanced from the stopper contact portions 46, and the load can be widely distributed at the planar portions 34B, 34C.

In the inner hood panel 34 of the present exemplary embodiment, the central region framework portion 44 and the second reinforcement bead 52 are coupled together by the first coupling bead 56, and the framework portion 44 and the third reinforcement bead 54 are coupled together by the second coupling bead 58. A portion of the load acting on the stopper contact portions 46 is thereby borne by the framework portion 44 through the second reinforcement bead 52 and the first coupling bead 56, and borne by the framework portion 44 through the third reinforcement bead 54 and the second coupling bead 58. Such operation also effectively suppresses local deformation at the stopper contact portions 46 of the inner hood panel 34.

Figure 4A:
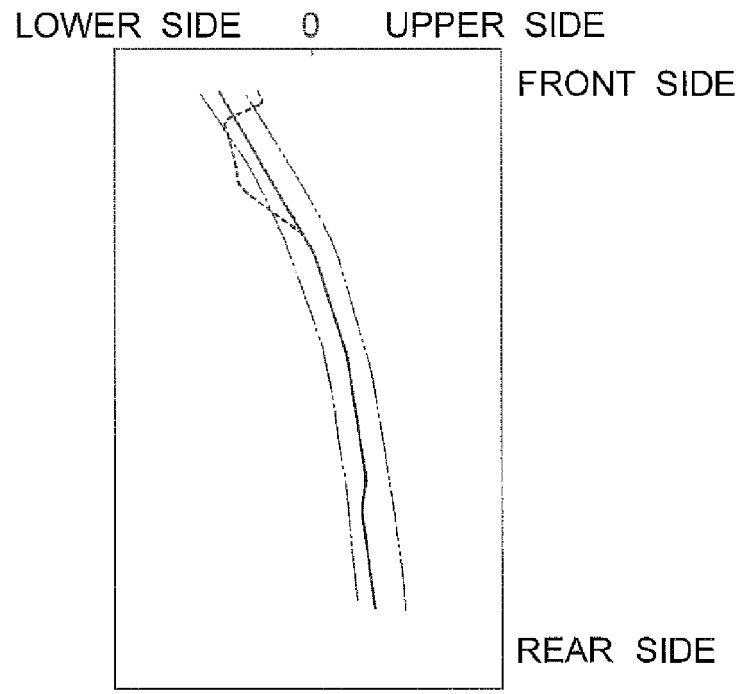
FIG. 4A is a graph comparing build states of left hood ends of a vehicle opening-closing body structure according to the exemplary embodiment of the present invention and a comparative structure.
Figure 4B:
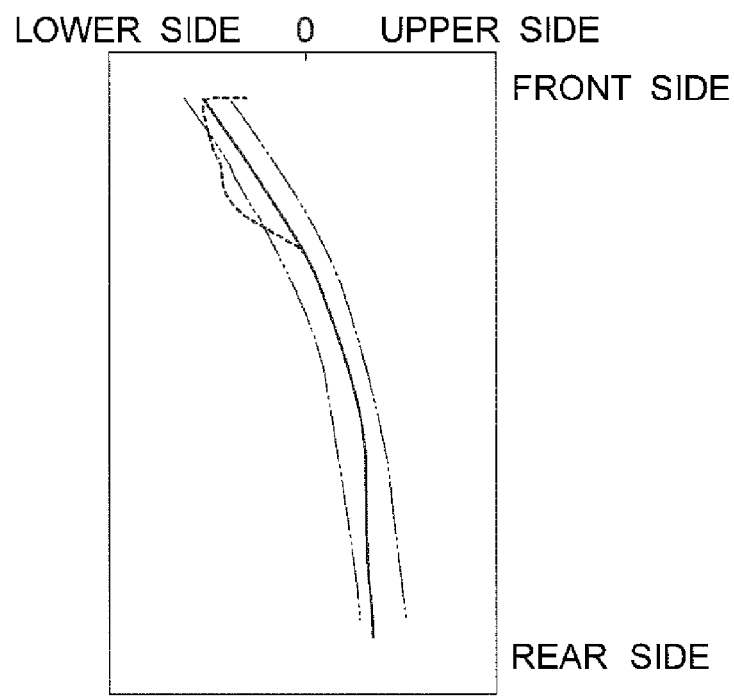
FIG. 4B is a graph comparing build states of right hood ends of a vehicle opening-closing body structure according to the exemplary embodiment of the present invention and a comparative structure.

Additional explanation follows with reference to the graphs in FIG. 4A and FIG. 4B, illustrating measurement results in a fitted state. FIG. 4A illustrates a hood left end in the fitted state, and FIG. 4B illustrates a hood right end in the fitted state. In the graphs, the vertical axis represents the position in the vehicle front-rear direction, and the horizontal axis represents an offset amount in the vehicle up-down direction, with reference to the height position of the hood front end when in an unlocked state (a state in which the hood front end is not pulled in).

The solid line in each of the graphs represents the results of the hood 30 applied with the vehicle opening-closing body structure according to the present exemplary embodiment, and the dotted line in each of the graphs represents the results of a hood applied with a comparative structure. The comparative structure is a structure not provided with the reinforcement beads 50, 52, 54 of the vehicle opening-closing body structure according to the present exemplary embodiment. Note that other portions of the comparative structure have a similar structure to the vehicle opening-closing body structure according to the present exemplary embodiment. The double-dotted dashed lines in each of the graphs represent an upper limit and a lower limit of a preferred range of the height position of the hood front end.

As illustrated in FIG. 4A and FIG. 4B, front side locations at both the left and the right of the hood with the comparative structure (see the dotted lines) are locally indented toward the vehicle lower side. In contrast thereto, in the hood 30 applied with the vehicle opening-closing body structure according to the present exemplary embodiment, as illustrated by the solid lines in the graphs, local indentation is suppressed at both left and right front side locations, and good build of the hood 30 is achieved.

As supplementary explanation, sometimes, for example, a specified rigidity cannot be achieved even when the plate thickness is simply made thinner, or the material is changed from a steel material to an aluminum alloy, a resin material, or the like in order to achieve weight reduction of a hood inner panel (a hood), such as in the above comparative structure. However, in the present exemplary embodiment, build performance can be secured while realizing weight reduction and cost reduction of the hood, since a specific rigidity is secured even with the same plate thickness and the same material as the comparative structure. Moreover, there is no need to attach a separate reinforcement member, or to extend the hood lock reinforcement 38 to the width direction position of the stopper contact portions 46 in order to secure a specific strength for the stopper contact portions 46 and the peripheral portions thereof illustrated in FIG. 3.

As explained above, the vehicle opening-closing body structure according to the present exemplary embodiment enables the build performance of the hood 30 illustrated in FIG. 1 to be improved.

Supplementary Explanation of Exemplary Embodiment

As a modified example of the above exemplary embodiment, the stopper contact portion may be a stopper contact portion contacting a stopper provided to another vehicle body side member (other than the upper radiator support 20), such as the upper apron members 14 as illustrated in FIG. 14.

As illustrated in FIG. 3, three reinforcement beads 50, 52, 54 are provided to one stopper contact portion 46 in the above exemplary embodiment; however, four or more reinforcement beads may be provided to one stopper contact portion. In such cases, plural reinforcement beads also extend from the stopper contact portion in plural directions, and each of the reinforcement beads is set in a position not on the same straight line as any other reinforcement bead.

In the exemplary embodiment, the reinforcement beads 50, 52, 54 are each formed in a protruding shape toward the hood upper side (the outer panel side); however the reinforcement beads may be formed in a protruding shape toward the hood lower side (the opposite side to the outer panel side).

In the above exemplary embodiment, the outer peripheral bead 42 is contiguously formed to the inner hood panel 34 so as to run around the outer peripheral portion thereof; however the outer peripheral bead may be outer peripheral beads formed intermittently along an outer peripheral portion of a panel.

In the above exemplary embodiment, the outer peripheral bead 42 is formed in a protruding shape toward the hood lower side (the opposite side to the outer panel side); however the outer peripheral bead may be formed in a protruding shape toward the hood upper side (the outer panel side).

As a modified example of the above exemplary embodiment, a configuration may be adopted in which two out of three reinforcement beads are connected to an outer peripheral bead.

As another modified example of the above exemplary embodiment, a configuration may be applied in which, out of the plural reinforcement beads, there are no reinforcement beads present that have terminal portions in the extension direction from a stopper contact portion contiguous, without a step, to a planar portion of a panel beyond the terminal portions in the extension directions. Moreover, a configuration may be applied, for example, in which one out of two reinforcement beads excluding the first reinforcement bead within the three reinforcement beads has a terminal portion in the extension direction from a stopper contact portion contiguous, without a step, to a planar portion of a panel beyond the terminal portion in the extension direction.

As another modified example of the above exemplary embodiment, a framework portion and one of plural reinforcement beads may be coupled together by a coupling bead. Moreover, a framework portion and all of the plural reinforcement beads may be coupled together by a coupling bead. A configuration in which there is no coupling bead coupling the framework portion and the reinforcement beads may also be adopted.

In the above exemplary embodiment, the coupling beads 56, 58 are formed in a protruding shape toward the hood upper side (the outer panel side); however the coupling beads may be formed in a protruding shape toward the hood lower side (the opposite side to the outer panel side).

The concept of "a position that is not on the same straight line" in the first aspect of the present invention includes, for example, as well as positioning such as that of the first reinforcement bead 50 with respect to the second reinforcement bead 52 not at all on the extension line of the second reinforcement bead 52, positioning such as that of the third reinforcement bead 54 with reference to the second reinforcement bead 52 in which a small portion near the stopper contact portion 46 is on the extension line of the second reinforcement bead 52. Viewed overall, such a position of the third reinforcement bead 54 is taken as not being on the extension line of the second reinforcement bead 52, with the same operation and advantageous effects as not being on the extension lines at all, and in practice is considered to be included in "a position that is not on the same straight line".

Note that combinations of the exemplary embodiment and the plural modified examples described may be implemented as appropriate.

Examples of the present invention have been given above, however the present invention is not limited to the above, and obviously various modifications may be implemented without departing from the scope of a range within the invention.

The entire content of Japanese Patent Application No. 2012-232035 is incorporated by reference within the present specification.

The invention claimed is:

1. An opening-closing body structure for a vehicle comprising:
    a stopper contact portion that is formed at a hood inner panel configuring an inner panel of a hood, serving as an opening-closing body covering an opening of a vehicle body front section and capable of opening and closing, and that contacts a stopper provided at the opening when the hood is in a closed state;
    at least three reinforcement beads that are formed at the hood inner panel, that extend in at least three directions from the stopper contact portion, and that are each formed at a position that is not on the same straight line as any other reinforcement bead; and
    an outer peripheral bead formed running along an outer peripheral portion of the hood inner panel, wherein,
    a first reinforcement bead that is one of the at least three reinforcement beads extends from the stopper contact portion toward the hood front side and is connected to the outer peripheral bead;
    a second reinforcement bead that is another of the at least three reinforcement beads extends from the stopper contact portion toward inside in a hood width direction; and
    a third reinforcement bead that is yet another of the at least three reinforcement beads extends from the stopper contact portion toward outside in the hood width direction with being angled toward a rear side.

2. The opening-closing body structure for the vehicle of claim 1, wherein the third reinforcement bead is connected to the outer peripheral bead.

3. The opening-closing body structure for the vehicle of claim 1, wherein at least one of the second reinforcement bead or the third reinforcement bead has a terminal portion in an extension direction from the stopper contact portion that is smoothly contiguous, without a step, to a planar portion of the hood inner panel beyond the terminal portion in the extension direction.

4. The opening-closing body structure for the vehicle of claim 1 further comprising:
    a framework portion formed at a central region of the hood inner panel; and
    a coupling bead that couples the framework portion and at least one of the plurality of reinforcement beads.

5. The opening-closing body structure for the vehicle of claim 2 wherein at least one of the second reinforcement bead or the third reinforcement bead has a terminal portion in an extension direction from the stopper contact portion that is smoothly contiguous, without a step, to a planar portion of the hood inner panel beyond the terminal portion in the extension direction.

6. The opening-closing body structure for the vehicle of claim 2 further comprising:
    a framework portion formed at a central region of the hood inner panel; and
    a coupling bead that couples the framework portion and at least one of the plurality of reinforcement beads.

7. The opening-closing body structure for the vehicle of claim 3 further comprising:
    a framework portion formed at a central region of the hood inner panel; and
    a coupling bead that couples the framework portion and at least one of the plurality of reinforcement beads.

8. The opening-closing body structure for the vehicle of claim 5 further comprising:
    a framework portion formed at a central region of the hood inner panel; and
    a coupling bead that couples the framework portion and at least one of the plurality of reinforcement beads.

* * * * *